United States Patent
Lee et al.

(10) Patent No.: US 9,288,664 B2
(45) Date of Patent: Mar. 15, 2016

(54) RELAY DEVICE AND METHOD FOR PROVIDING DEVICE MANAGEMENT SERVICE

(75) Inventors: Ji-Hye Lee, Gyeonggi-do (KR); Wuk Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1025 days.

(21) Appl. No.: 13/053,742

(22) Filed: Mar. 22, 2011

(65) Prior Publication Data
US 2011/0238807 A1 Sep. 29, 2011

(30) Foreign Application Priority Data
Mar. 25, 2010 (KR) .................. 10-2010-0026589

(51) Int. Cl.
G06F 15/173 (2006.01)
H04W 8/24 (2009.01)
H04B 7/155 (2006.01)

(52) U.S. Cl.
CPC . *H04W 8/24* (2013.01); *H04B 7/155* (2013.01)

(58) Field of Classification Search
CPC ................................ H04W 8/24; H04B 7/155
USPC .......................................................... 709/223
See application file for complete search history.

(56) References Cited

U.S. PATENT DOCUMENTS

| 2007/0082657 | A1 | 4/2007 | Kim |
| 2007/0190939 | A1 | 8/2007 | Abel |
| 2008/0256251 | A1 * | 10/2008 | Huotari et al. ............... 709/229 |
| 2009/0003269 | A1 * | 1/2009 | Kumazawa et al. ......... 370/328 |
| 2009/0054092 | A1 * | 2/2009 | Stonefield et al. ........... 455/466 |
| 2009/0175276 | A1 * | 7/2009 | Tsuge et al. ................. 370/392 |
| 2010/0062770 | A1 * | 3/2010 | Flynn et al. ................. 455/436 |
| 2010/0265880 | A1 * | 10/2010 | Rautiola et al. ............. 370/328 |
| 2011/0082940 | A1 * | 4/2011 | Montemurro et al. ...... 709/227 |
| 2012/0011222 | A1 * | 1/2012 | Yasukawa et al. .......... 709/217 |

FOREIGN PATENT DOCUMENTS

| KR | 1020060074954 | 7/2006 |
| KR | 1020100027819 | 3/2010 |

* cited by examiner

*Primary Examiner* — Karen Tang
(74) *Attorney, Agent, or Firm* — The Farrell Law Firm, P.C.

(57) ABSTRACT

A method for providing a Device Management (DM) service to various devices by a relay device is provided. In the method, the relay device registers in a DM server a relay function for providing a DM service based on the relay device to at least one device. If at least one device is discovered in a Personal Area Network (PAN) managed by the relay device, the relay device determines a relay mode with the at least one device, and provides a DM service from the DM server to the at least one device according to the determined relay mode.

18 Claims, 6 Drawing Sheets

RELAY DEVICE AND METHOD FOR PROVIDING DEVICE MANAGEMENT SERVICE

PRIORITY

This application claims priority under 35 U.S.C. §119(a) to a Korean Patent Application filed in the Korean Intellectual Property Office on Mar. 25, 2010 and assigned Serial No. 10-2010-0026589, the entire content of which is incorporated herein by reference.

BACKGROUND OF THE INVENTION

1. Field of the Invention

The present invention relates generally to Device Management (DM), and more particularly, to an apparatus and method for providing a DM service using a relay device.

2. Description of the Related Art

Due to an increase in the type of and the number of terminals or devices carried by various users (e.g., a Motion Picture Experts Group (MPEG) audio-layer 3 (MP3) player, a Portable Multimedia Player (PMP), a Personal Digital Assistant (PDA), a cell phone, etc.), and an increase in the functionality of such mobile devices, a network including the mobile devices may be formed in order to enable content sharing among devices owned by a user. Such a network formed among the personal mobile devices is called a Personal Area Network (PAN).

A PAN may be formed according to various communication schemes including Bluetooth, Wireless-Fidelity (WI-FI), Infrared Data Association (IrDA), etc. Recently, PANs based on Universal Plug & Play (UPnP) have entered into commercial use. All devices supporting an associated PAN communication scheme may participate in a PAN associated with the same communication scheme.

In order to remotely manage various firmwares, softwares, parameters, schedules, and Hard Ware (H/W) capabilities of devices that can participate in a PAN but cannot directly access an external network or do not have a DM client, a new networking environment has been developed, in which a device with a DM client is used as a relay device.

When a device supporting a DM service is used as a relay device, the relay device delivers a message from another device after establishing a remote DM session for a third device. In this way, the relay device forms a PAN with various devices centering on the relay device, in order for the various devices to receive a DM service through the relay device. However, there currently is no detailed proposal regarding the specific manner in which a plurality of devices and the relay device set a relay mode between them to provide a DM service and whether these devices can register and deregister in/from a DM server. Therefore, in order to expand the role of the relay device, there is a need for a method for allowing the relay device to set a relay mode and enable registration and deregistration in/from a DM server.

SUMMARY OF THE INVENTION

An aspect of the present invention is to address at least the above-mentioned problems and/or disadvantages and to provide at least the advantages described below. Accordingly, an aspect of the present invention provides an apparatus and method for allowing a relay device to provide a DM service to various devices centering on the relay device. Another aspect of the present invention provides an apparatus and method for allowing a relay device to manage various devices in various relay modes.

In accordance with one aspect of the present invention, a method for providing, by a relay device, a Device Management (DM) service is provided. The method includes registering, to a DM server, a relay function for providing a DM service based on the relay device to at least one device; if at least one device is discovered in a Personal Area Network (PAN) managed by the relay device, determining a relay mode for each of the at least one device; and providing a DM service from the DM server to the at least one device according to the determined relay mode.

In accordance with another aspect of the present invention, a relay device for providing a DM service to at least one device is provided. The relay device includes a communication module for forming a PAN with at least one device, and transmitting and receiving data over the PAN; and a DM client for registering in a DM server a relay function for providing a DM service based on the relay device to the at least one device, and if at last one device is discovered in the PAN managed by the relay device, determining a relay mode for each of the at least one device, and providing a DM service from the DM server to the at least one device through the communication module according to the determined relay mode.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Although the terms of entities defined in Device Management (DM) of Open Mobile Alliance (OMA), the standard organization for mobile applications, are used herein for convenience of description, the DM of OMA standard, as well as the definitions terms defined therein are not intended to limit the scope of the present invention and the definitions of such terms. Accordingly, the present invention may be applied to other similar systems.

According to an embodiment of the present invention, a method for providing a DM service to various devices centering on a relay device is provided. To this end, such an embodiment of the present invention includes a process in which a relay device registers its relay function in a DM server so as to inform that the relay device itself is a device serving as a relay, sets a relay mode with at least one device included in a PAN managed by the relay device, and then provides a DM service associated with the set relay mode. According to another embodiment of the present invention, a process in which the relay device deregisters its relay function from the DM server if all devices connected to the relay device have terminated their DM sessions is provided. According to embodiments of the present invention, the relay device may expand its role as a relay and thus provide DM services associated with various relay modes.

A configuration of a DM system implementing the above-described functions is described as follows with reference to FIG. 1.

Figure 1:
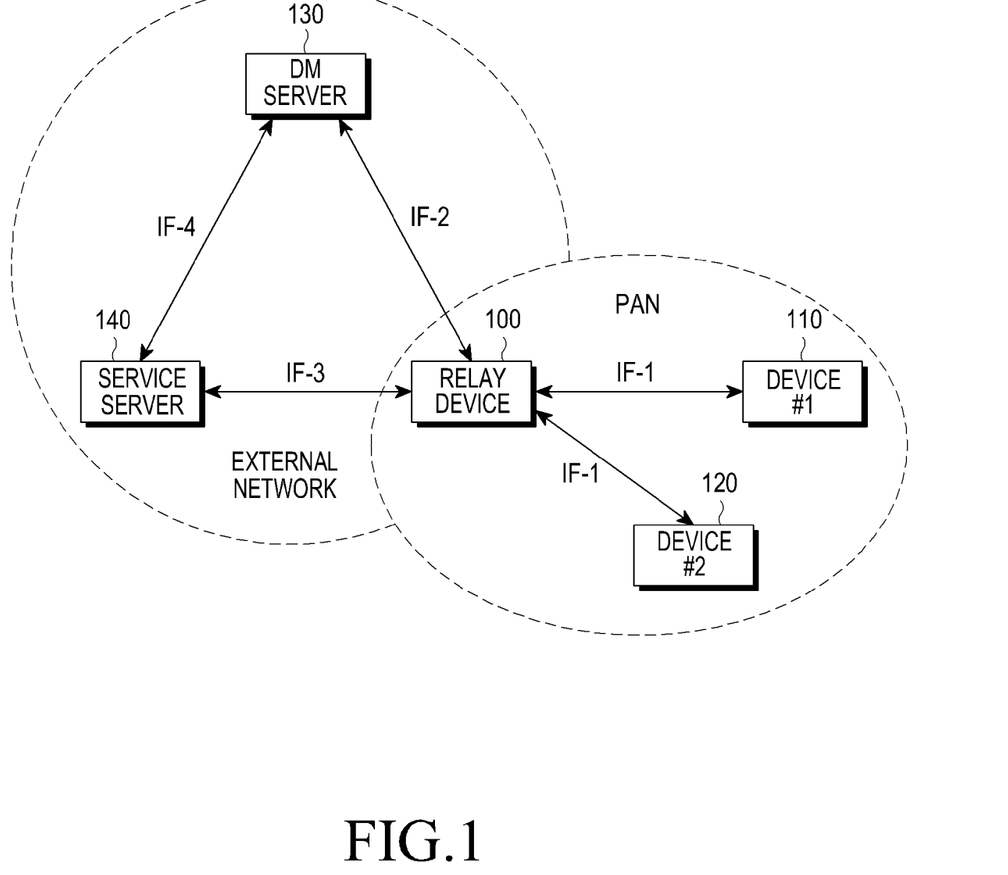
FIG. 1 is a system configuration diagram for providing a DM service using a relay device according to an embodiment of the present invention.

FIG. 1 illustrates a system configuration for providing a DM service using a relay device according to an embodiment of the present invention.

Referring to FIG. 1, the DM system includes a relay device 100, a first device 110, a second device 120, a DM server 130, and a service server 140. A plurality of various personal devices, including the relay device 100, the first device 110 and the second device 120, form a PAN.

The DM server 130, which is located in an external network, may manage various firmware, software, parameters, schedules and H/W capabilities in devices by reading, adding, deleting, changing and/or running objects of the devices to be managed, using a DM protocol. The DM server 130 includes a controller (not illustrated) for controlling operations required for the above management functions, and a transceiver for exchanging messages with the devices subjected to management. The below-described operations of the DM server 130 are performed under control of the controller.

The service server (which may also be described as a "service providing server") 140 provides devices with various services, including game content, multimedia content and advertisement content. The service server 140 provides, not only various content and data, but also provides various programs, firmware and software required to play related content.

The first and second devices 110 and 120 can access the PAN. However, the first and second devices 110 and 120 cannot directly access the external network, or do not include a DM client, or include a DM client supporting a DM protocol other than the DM protocol supported by the DM server 130. Accordingly, in according to embodiments of the present invention, that the first and second devices 110 and 120 can receive DM messages from the DM server 130 through the relay device 100. The first and second devices 110 and 120 may be any of various devices including MP3 players, PMPs, televisions, etc.

Accordingly, each of the first and second devices 110 and 120 includes a communication module supporting access to the PAN. Each of the first and second devices 110 and 120 also includes a controller for participating in the PAN by controlling the communication module, and controlling an operation of the device so as to enable remote DM according to the present invention by controlling data or message exchange with the relay device 100 through the communication module. In addition, each of the first and second devices 110 and 120 includes a memory for storing device information and data acquired from the remote DM results.

The relay device 100 is capable of accessing, not only the PAN but also the external network. The relay device 100 includes a DM client compatible with the DM server 130. According to embodiments of the present invention, the relay device 100 is a DM device that is set as a gateway device or a proxy device, and serves as a relay for DM between the DM server 130 in the external network and the first and second devices 110 and 120 in the PAN. The relay device 100 may also communicate with the service server 140, and may request and receive various content and data provided by the service server 140.

The relay device 100 may send a request for required content to the service server 140 (instead of the first and second devices 110 and 120) and provide the first and second devices 110 and 120 with the various content and data received from the service server 140 in response to the request. The relay device 100 may any of various devices, including a cell phone, a PDA, etc. The relay device 100 may also be a wired device, such as a Personal Computer (PC), a set-top box, etc., instead of a mobile device.

Figure 2:
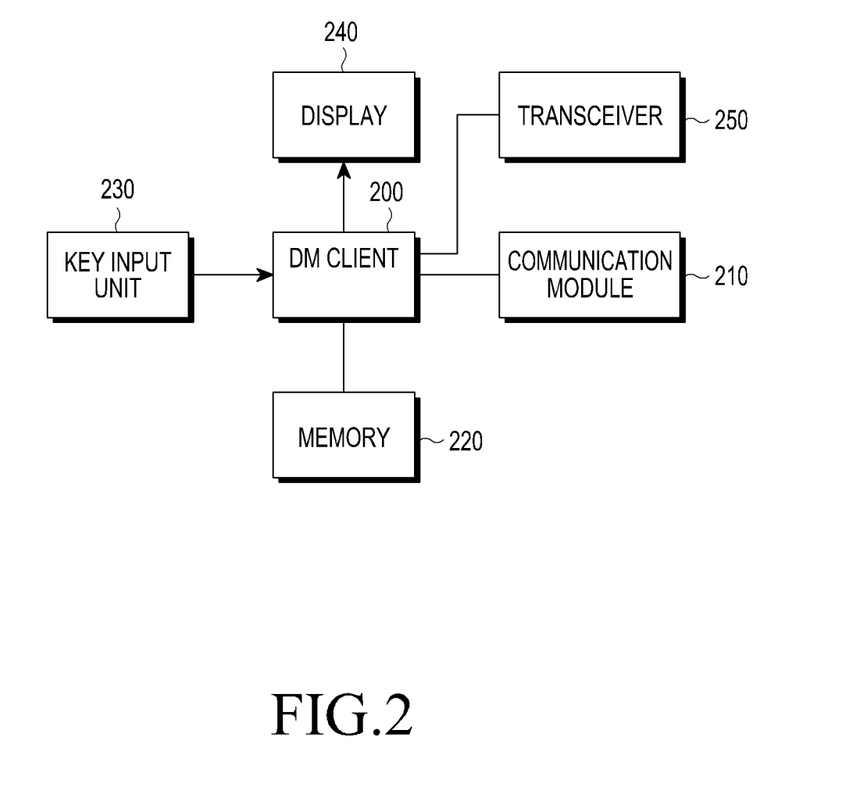
FIG. 2 is a block diagram of a relay device according to an embodiment of the present invention.

FIG. 2 is a block diagram illustrating a relay device according to an embodiment of the present invention.

Referring to FIG. 2, the relay device 100 includes a DM client 200, a communication module 210 that forms a PAN with the first and second devices 110 and 120 and exchanges data with them over the PAN, and a memory 220 for storing various data used in a DM operation process. If a DM protocol of the DM server 130 is different from a DM protocol supported by the first and second devices 110 and 120, the memory 220 further stores a translation application in order to facilitate compatible communications between the DM server 130 and the first and second devices 110 and 120. Using the translation application, the relay device 100 translates and modifies messages exchanged between the DM server 130 and the devices 110 and 120.

According to an embodiment of the present invention, the relay device 100 further includes a key input unit 230 for allowing a user to set a relay mode on the relay device 100, and a display 240 for displaying a relay mode setting screen.

The DM client 200 controlling the overall DM operation controls data and/or message exchange with the DM server 130. The DM client 200 may perform communication with the service server 140. In addition to the DM client 200, the relay device 100 may further include a transceiver 250, which performs data exchange with the DM server 130 and the service server 140.

In the foregoing description, it is assumed that a relay device forms a PAN. In a DM system according to embodiments of the present invention, although the relay device 100 may establish a DM session to the first or second device 110 or 120 and then deliver messages from the DM server 130 through the established DM session, embodiments of the present invention may also provide the following method in order for the relay device 100 to provide DM services associated with various relay modes.

According to an embodiment of the present invention, (i) a method in which a relay device 100 registers its relay function as a relay, (ii) a method and procedure for determining a relay mode between the relay device 100 and one or more the third device and providing a DM service associated with the determined relay mode, and (iii) a method for deregistering the relay function may be provided. For clarity, a transparent mode, a proxy mode, and an adaptation mode are given as examples of relay modes. These relay modes are described in detail herein below.

Herein below, various embodiments of the present invention are described independently. An embodiment of the present invention includes a process in which, if devices 110 and 120 connected to a relay device 100 set a relay mode and inform the relay device 100 of the set relay mode, then the relay device 100 provides a DM service according to the set relay mode. Another embodiment of the present invention includes a process in which if a user directly sets a relay mode with the devices 110 and 120 on the relay device 100, then the relay device 100 provides a DM service according to the set relay mode.

Figure 3:
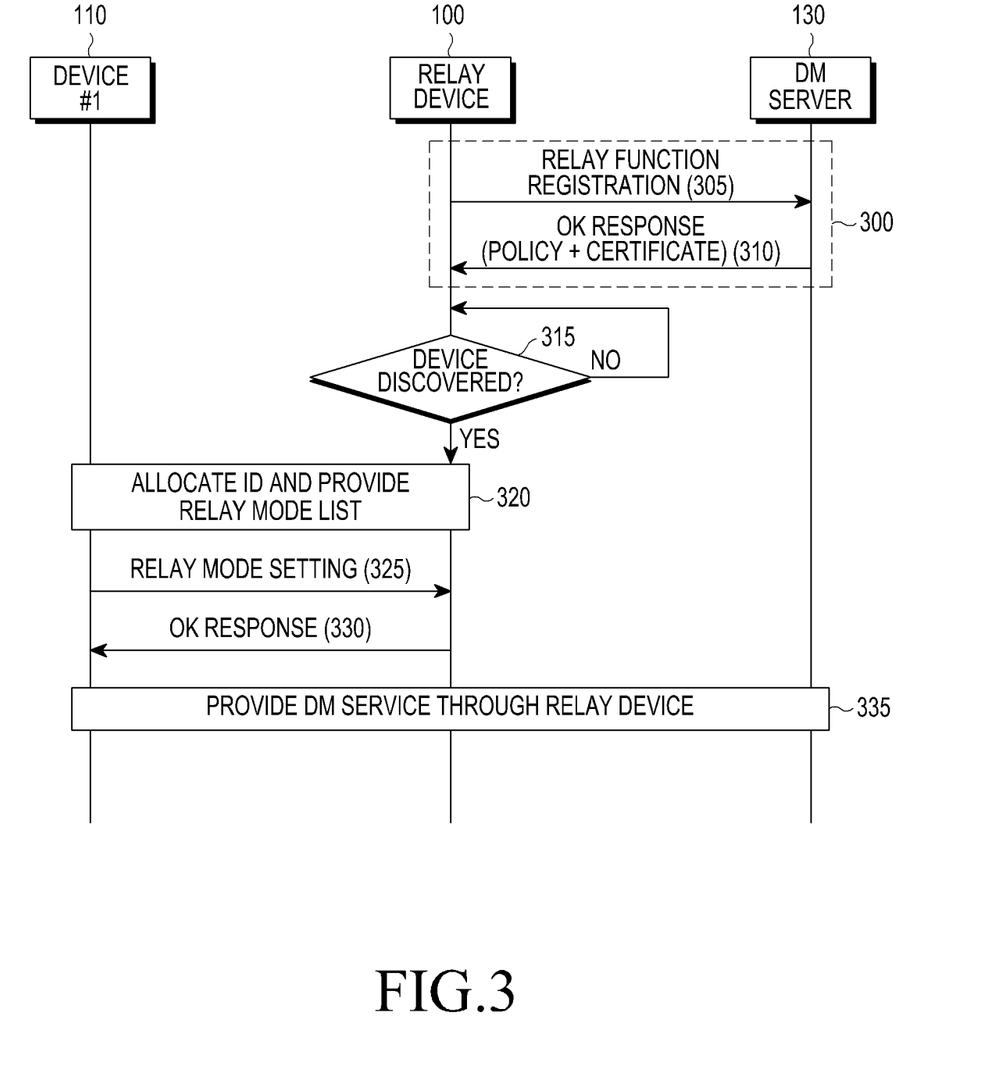
FIG. 3 is a diagram illustrating a relay mode setting process between a relay device and the third device according to an embodiment of the present invention.

A process corresponding to one embodiment of the present invention, in which devices 110 and 120 connected to a relay device 100 set a relay mode, is described herein with reference to FIG. 3.

FIG. 3 is a diagram illustrating a relay mode setting process between a relay device and the third device according to an embodiment of the present invention.

More specifically, FIG. 3 illustrates a procedure in which a relay device 100 registers its relay function in a DM server 130 and undergoes authentication, and a process in which a first device 110 in a PAN selects a relay mode and sets the selected relay mode with respect to the relay device 100. Although only the first device 110 is described herein with respect to FIG. 3, for convenience of description, a second device 120 may also select a relay mode and set the selected relay mode with respect to the relay device 100.

Referring to FIG. 3, the relay device 100 with a DM client performs a registration process to serve as a relay in step 300. To be specific, if the relay device 100 sends a relay function registration message to the DM server 130 to serve as a relay in step 305, the DM server 130 checks information about the relay device 100 and then sends an OK response message to the relay device 100 in step 310. The OK response message includes a policy and a certificate for the relay function set by the DM server 130.

In this manner, if a device that supports a DM service by having a DM client registers its relay function, the device supporting the DM service may serve as a relay device.

Thereafter, by performing a device discovery operation, the relay device 100 determines, in step 315, whether any devices are discovered in its own PAN. Upon discovering at least one device, the relay device 100 allocates an IDentifier (ID) to the discovered device, and then provides a relay mode list of the relay device 100 to the discovered device. For example, in step 320, the relay device 100 allocates an ID to the first device 110 and provides its relay mode list to the first device 110. By allocating an ID to each discovered device, the relay device 100 may perform correct DM in performing download and update operations with respect to each device.

In establishing a session to the DM server 130 through the relay device 100 in order to receive a DM service, the first device 110 may select a relay mode from the relay mode list provided from the relay device 100 and set the selected relay mode. These relay modes include a transparent mode, a proxy mode, and an adaptation mode, for example.

When the transparent mode is selected, the relay device 100 performs a message delivery function between the DM server 130 and the first device 110, and may be further limited to providing only the message delivery function. For example, assume that the relay device 100 is a cell phone, the first device 110 is an MP3 player, and a user is holding the MP3 player in a hand, with the cell phone put in a pocket. This transparent mode is useful when a user desires to update a firmware of the MP3 player, by updating the firmware in the MP3 player through the cell phone without the changing the devices directly used by the user. For example, the transparent mode may be useful when the user primarily uses the first device 110.

When the proxy mode is selected, the DM server 130 entrusts DM rights to the relay device 100, and in this proxy mode, the first device 110 performs communication, while considering the relay device 100 as the DM server 130. In the present example of the proxy mode, it is assumed that the relay device 100 is a cell phone, the first device 110 is an MP3 player, and a user is using the cell phone, while the MP3 player is located elsewhere, such as in the user's bag. This proxy mode may be useful when the user is not required to directly use the first device 110, because the user may update the firmware of the MP3 player using the cell phone without removing the MP3 player from the bag.

When providing a DM service to a device (which may one of one or more of devices 110 and 120, for example) and whose relay mode with the relay device 100 is a proxy mode, the relay device 100 may collect messages transmitted by the DM server 130 and send the collected messages to the devices 110 and 120 in the proxy mode in the PAN and the DM server 130 may gather event information of the devices 110 and 120 and transmits the gathered information. The relay device 100 may manage a plurality of devices in the PAN while operating in the proxy mode.

When the adaptation mode is selected, if a DM protocol of the DM server 130 is different from a DM protocol supported by the first device 110, the relay device 100 performs message translation and modification so that the DM server 130 may be compatible with the first device 110. For example, if the first device 110 has an OMA DM client but the second device 120 has an UPnP DM client, then the relay device 100 performs message translation and modification for each device, in order to provide compatibility with the DM server 130.

Therefore, the first device 110 may select any one of the above relay modes, and deliver setting information for the selected relay mode to the relay device 100 in step 325. In response, the relay device 100 delivers an OK response message to the first device 110 in step 330. Thereafter, the relay device 100 provides a relay device-based DM service according to the relay mode set by the first device 110 in step 335. In other words, the devices perform a DM session associated with the set relay mode.

Figure 4:
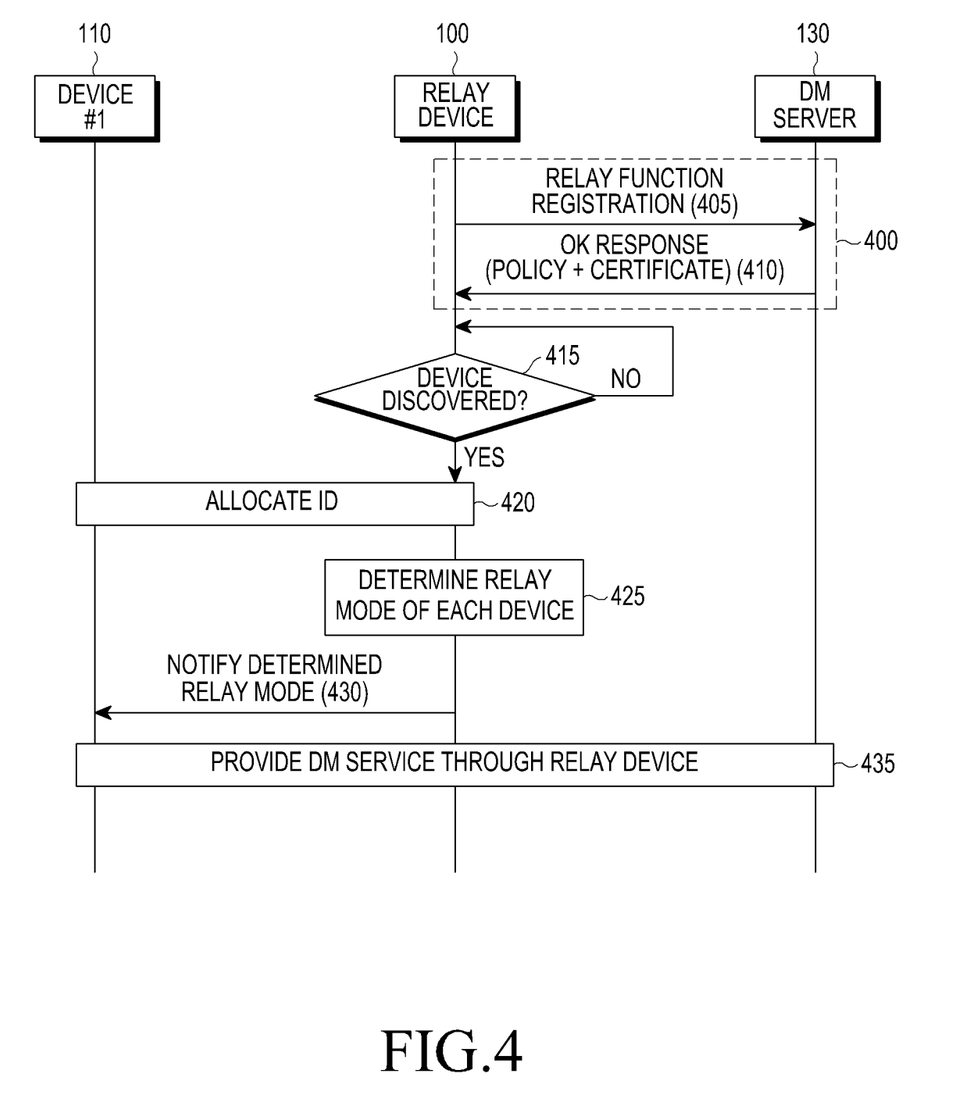
FIG. 4 is a diagram illustrating a relay mode setting process between a relay device and the third device according to another embodiment of the present invention.

FIG. 4 is a diagram illustrating a relay mode setting process between a relay device and the third device according to another embodiment of the present invention.

More specifically illustrates a process in which a relay device 100 directly sets relay modes of the devices in its own PAN. Referring to FIG. 4, since steps 400 to 420 in FIG. 4 refer to the same operations as steps 300 to 320 in FIG. 3, a detailed description thereof is omitted. In step 425, the relay device 100 determines a relay mode of each device. In determining a relay mode, a user may select and set a relay mode for each device according to a user interface screen provided in the relay device 100.

In the present example, where the relay device 100 sets relay modes for all devices, a user may set relay modes of all devices at one time, relay modes for each device, one at a time. After the relay modes are set, the relay device 100 informs the first device 110 of the determined relay mode, in step 430. Each device may be distinguished according to an allocation of a unique ID. Accordingly, the relay device 100 may use the unique IDs to inform each device corresponding to an allocated ID of the corresponding determined relay mode. The process of informing the determined relay mode in step 430 is optional.

When a relay mode is set such that the relay mode centers on the relay device 100, since the relay device 100 provides a DM service associated with the set relay mode in step 435, the relay device 100 is not required to inform, the devices 110 and 120 in its pan, of the determined relay mode. However, when the relay device 100 operates in a transparent mode with respect to the first device 110, since the relay device 100 merely performs only a message delivery function, the relay device 100 may be adapted to inform the first device 110 of the determined relay mode, only for the transparent mode, so that the first device 110 may actively control message exchange with the relay device 100.

Among the devices connected to a relay device, a device desiring to release a DM session may send a release request for the DM session to the relay device. If all the devices connected to the relay device have released the DM session, the relay device may deregister its relay function from a DM server, as the relay device no longer needs to serve as a relay. This relay function deregistration process is described with reference to FIGS. 5 and 6.

Figure 5:
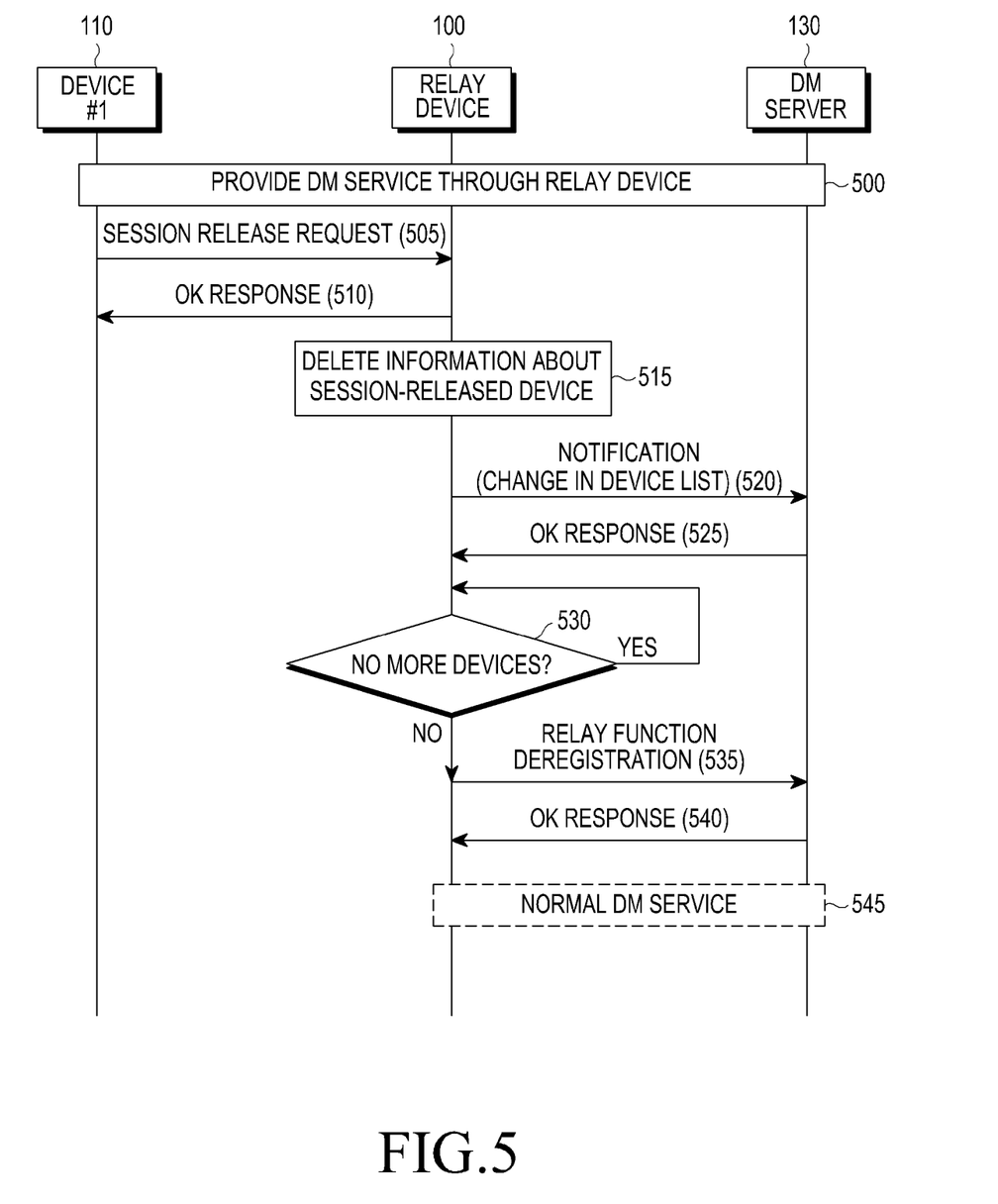
FIG. 5 is a diagram illustrating a process of releasing a DM session according to an embodiment of the present invention.

FIG. 5 is a diagram illustrating a process of releasing a DM session according to an embodiment of the present invention.

Referring to FIG. 5, a relay device 100 notifies a DM server 130 of a session release and deregisters its relay function from the DM server 130. In step 500, a DM service centering on the relay device 100 is provided to at east one device. In order to indicate a desire to terminate the ongoing DM session, the first device 110 sends a session release request to the relay device 100 in step 505. In response, the relay device 100 sends an OK response message in step 510. In step 515, since the relay device 100 no longer needs to provide the DM service to the first device 110, the relay device 100 deletes information about the session-released device (i.e., information about the first device 110).

By deleting the information about the first device 110, a list of devices controllable by the relay device 100 is modified. Accordingly, the relay device 100 informs the DM server 130 of the modified device list. In step 502, the relay device 100 sends the DM server 130 a notification message indicating the modification of its controllable device list so that the DM server 130 may also stop providing the DM service to the first device 110.

The relay device 100 deletes the information about the session-released device in step 515, when the relay device 100 operates in a proxy mode or an adaptation mode as a relay mode with the first device 110. However, if a transparent mode is set, the relay device 100 merely serves as a message delivery path and is not required to manage device information such as deleting information about the session-released devices as in step 515. Therefore, when the transparent mode is set, step 515 is optional. The message delivered to the DM server 130 in step 520 is replaced with the session release request message received in step 505. For a relay device 100 operating in the transparent mode, steps 515 and 520 may be changed such that upon receiving a session release request from the first device 110, the relay device 100 forwards the received session release request to the DM server 130.

Upon receiving an OK response message from the DM server 130 in step 525, the relay device 100 checks, in step 530, whether any other devices connected are to the PAN. If no device are connected to the PA (e.g., such as when all the devices connected to the PAN have released the DM session), the relay device 100 may send a relay function deregistration message to the DM server 130 to deregister its relay function in step 535. Upon receiving an OK response message from the DM server 130 in step 540, the relay device 100 performs a normal DM service with the DM server 130 in step 545. Alternatively, the relay device 100 may determine whether it is efficient to maintain the DM session to the DM server 130, and may subsequently determine whether to terminate the DM session according to the determination.

As described above, in the presence of a session release request, the relay device 100 forwards the intact session release request to the DM server 130, or notifies the DM server 130 of the change in its controllable device list.

Figure 6:
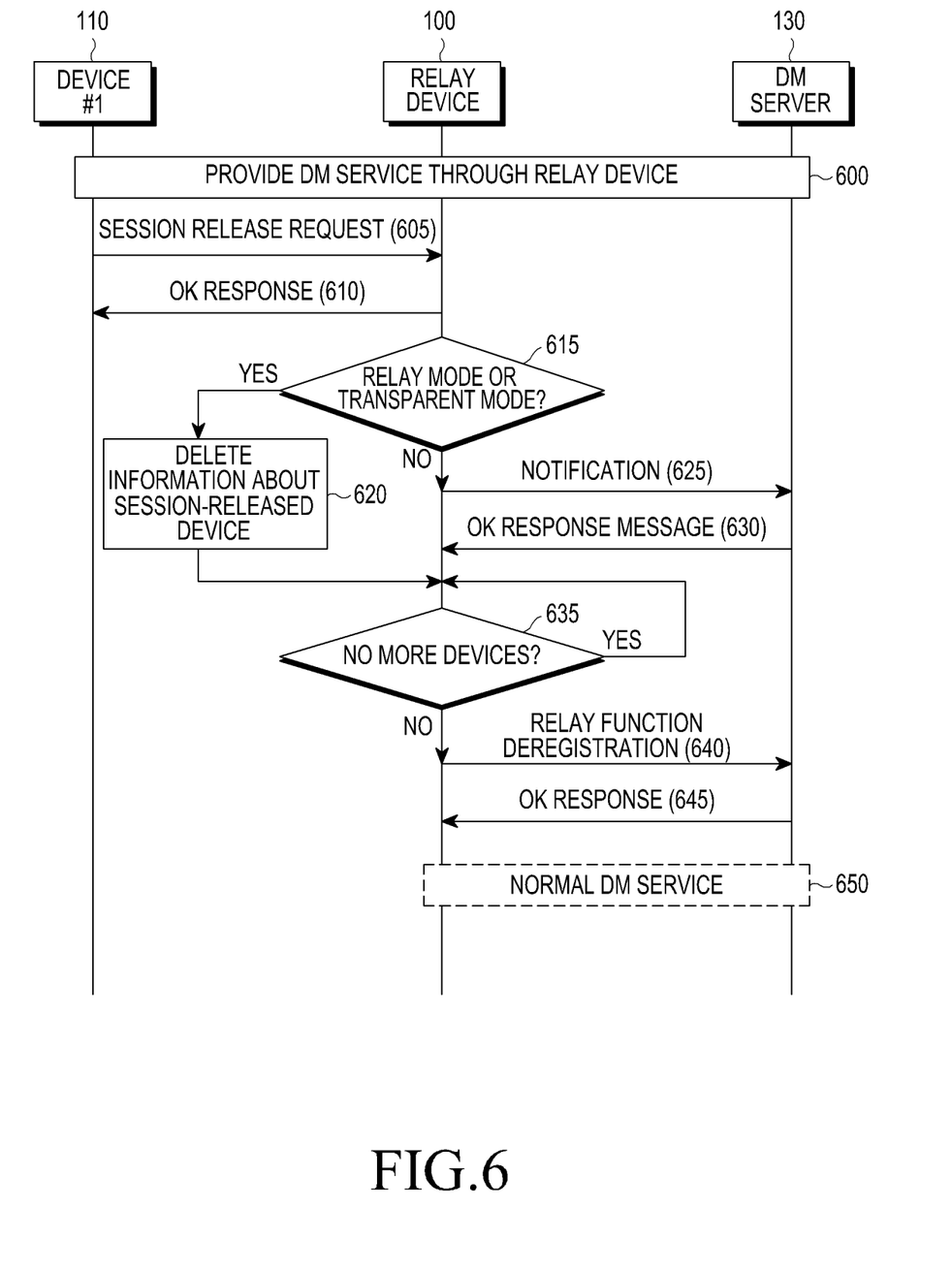
FIG. 6 is a diagram illustrating a process of releasing a DM session according to another embodiment of the present invention.

FIG. 6 is a diagram illustrating a process of releasing a DM session according to another embodiment of the present invention.

Referring to FIG. 6, a relay device 100 determines whether to notify a DM server 130 of the release according to the relay mode, and then deregisters its relay function from the DM server 130 depending on the determination. Since steps 600 to 610 in FIG. 6 are identical in operation to steps 500 to 510 in FIG. 5, a detailed description thereof will be omitted. However, according to another embodiment of the present invention, upon receiving a session release request from a first device 110, a relay device 100 determines in step 615 whether its relay mode with the first device 110 is a transparent mode. If the relay mode is not a transparent mode (i.e., if the relay mode is a proxy mode or an adaptation mode), the relay device 100 releases the DM session to the first device 110 having requested the session release, and then deletes information about the first device 110 whose session is released, in step 620. When the relay mode is either of the proxy mode or the adaptation mode, a DM service request is transmitted to the DM server 130 not by the first device 110, but by the relay device 100. Therefore, the DM server 130 considers its DM session to the relay device 100 to be in progress, and the relay device 100 may optionally withhold notifying the DM server 130 of the session release request from the first device 110.

However, if the relay mode is a transparent mode, in step 615, the relay device 100 merely serves as a message delivery path, and therefore, the relay device 100 forwards a session release request from the first device 110, if any, to the DM server 130 in step 625. As described above, the relay device 100 informs the DM server 130 of the session release request from the first device 110. After receiving an OK response message from the DM server 130 in reply to the notification, in step 630, the relay device 100 performs steps 635 to 650, which are equivalent to steps 530 to 545 described herein with respect to FIG. 5.

In this manner, the relay device 100 establishes a DM session to one more devices in its own PAN according to a determined relay mode, and then deregisters its relay function if all devices connected to the relay device 100 have requested release of the DM session.

As is apparent from the foregoing description, according to embodiments of the present invention, a relay device may provide DM services associated with various relay modes to the third device, enabling application of the user-preferred DM relay mode. A relay device in accordance with embodiments of the present invention may provide a connection role so that a DM server may directly control the third device, or the relay device may receive from the DM server the authority to control the third device. A user may also authorize a relay device to control DM for the third device, or may select a relay mode so as to directly check DM control on the third device.

By registering a relay device in a DM server, the relay device may gather messages to be delivered to a plurality of devices connected to its PAN, and send the gathered messages at one time, and if there is a change in its PAN, the relay device notifies the DM server of the change in the PAN, preventing occurrence of unnecessary communication and thus improving network efficiency.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing, by a relay device, a device management (DM) service, the method comprising:
   detecting at least one device in a personal area network (PAN) managed by the relay device;
   identifying information associated with a relay mode for each of the at least one detected device, in response to a user selection of the relay mode for the at least one detected device;
   providing a DM command from a DM server to the at least one detected device according to the identified information associated with the relay mode; and
   establishing a session with the at least one device based on the identified information associated with the relay mode,
   wherein the information associated with the relay mode includes at least one of:
   a transparent mode where the relay device forwards the DM command to the at least one detected device,
   a proxy mode where the relay device manages the at least one detected device on behalf of the DM server over a DM protocol of the DM server, and
   an adaptation mode where the relay device manages the at least one detected device on behalf of the DM server over a protocol supportable by the at least one detected device.

2. The method of claim 1, wherein providing the DM command from the DM server comprises:
   if providing the DM command to a device, which is one of the at least one device and whose relay mode with the relay device is the proxy mode, collecting a message from the DM server; and
   transmitting the collected message to the device in the proxy mode.

3. The method of claim 1, further comprising:
   upon detecting the at least one device, allocating an identifier to each of the at least one detected device; and
   providing, to the at least one detected device, a list of relay modes supported by the relay device.

4. The method of claim 1, wherein identifying the information associated with the relay mode for each of the at least one detected device comprises receiving, from the at least one device, information indicating a relay mode selected and set for each of the at least one detected device.

5. The method of claim 1, wherein identifying the information associated with the relay mode for each of the at least one detected device comprises:
   providing, through the relay device, a relay mode selection screen for the at least one detected device; and
   receiving the user selection of the relay mode for the at least one detected device according to the relay mode selection screen.

6. The method of claim 1, further comprising:
   receiving a session release request from one of the at least one device for requesting a release of a DM session;
   upon receiving the session release request, releasing the DM session to the device corresponding to the received session release request;
   determining whether all of DM sessions corresponding to the at least one device have been released; and
   if all of the DM sessions corresponding to the at least one device have been released, releasing a session to the DM server.

7. The method of claim 6, further comprising,
   if a relay mode with the device corresponding to the session release request is the transparent mode, sending the session release request to the DM server.

8. The method of claim 6, further comprising,
   if a relay mode with the device corresponding to the session release request is the proxy mode or the adaptation mode, deleting information about the device corresponding to the session release request.

9. The method of claim 8, further comprising,
   after deleting the information about the device corresponding to the session release request, informing the DM server of a change in a device list managed by the relay device.

10. A relay device for providing a device management (DM) service to at least one device, the relay device comprising:
    a controller for detecting at least one device in a personal area network (PAN) managed by the relay device and identifying information associated with a relay mode for each of the at least one detected device, in response to a user selection of the relay mode for the at least one detected device, and establishing a session with the at least one device based on the identified information associated with the relay mode; and
    an interface unit for providing a DM command from a DM server to the at least one detected device according to the identified information associated with the relay mode,
    wherein the identified information associated with the relay mode includes at least one of:
    a transparent mode where the relay device forwards the DM command to the at least one detected device,
    a proxy mode where the relay device manages the at least one detected device on behalf of the DM server over a DM protocol of the DM server, and
    an adaptation mode where the relay device manages the at least one detected device on behalf of the DM server over a protocol supportable by the at least one detected device.

11. The relay device of claim 10, further comprising a memory for storing a translation application for performing translation and modification on messages exchanged between the DM server and a device in the adaptation mode.

12. The relay device of claim 10, wherein upon detecting the at least one device, the controller allocates an identifier to each of the at least one detected device, and provides, to the at least one detected device, a list of relay modes supported by the relay mode.

13. The relay device of claim 10, wherein the controller controls the interface unit to receive, from the at least one device, information indicating a relay mode selected and set for each of the at least one detected device, and determines the information associated with the relay mode based on the received information.

14. The relay device of claim 10, further comprising:
    a key input unit for receiving information indicating the relay mode set by a user; and
    a display for displaying a screen for indicating a selection of a relay mode to be set.

15. The relay device of claim 10, wherein upon receiving a session release request from one of the at least one device for indicating a request of a release from a DM session, the controller releases a DM session to the device corresponding to the session release request, determines whether all of DM sessions corresponding to the at least one device have been released, and releases a session to the DM server if the DM sessions corresponding to all of the at least one device have been released.

16. The relay device of claim 15, wherein if a relay mode with the device corresponding to the session release request is the transparent mode, the controller informs the DM server of the session release request.

17. The relay device of claim 15, wherein if the relay mode with the device corresponding to the session release request is the proxy mode or the adaptation mode, the controller deletes information about the device corresponding to the session release request.

18. The relay device of claim 17, wherein after deleting the information about the device corresponding to the session release request, the controller informs the DM server of a change in a device list managed by the relay device.

\* \* \* \* \*